US006999990B1

(12) United States Patent
Sullivan et al.

(10) Patent No.: US 6,999,990 B1
(45) Date of Patent: *Feb. 14, 2006

(54) TECHNICAL SUPPORT CHAIN AUTOMATION WITH GUIDED SELF-HELP CAPABILITY, ESCALATION TO LIVE HELP, AND ACTIVE JOURNALING

(75) Inventors: Francis X. Sullivan, Round Rock, TX (US); Brian Jay Vetter, Austin, TX (US)

(73) Assignee: Motive, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/310,795

(22) Filed: May 12, 1999

Related U.S. Application Data

(63) Continuation-in-part of application No. 09/215,873, filed on Dec. 18, 1998, now Pat. No. 6,615,240.

(51) Int. Cl.
*G06F 15/16* (2006.01)

(52) U.S. Cl. ............... 709/205; 709/204; 709/224; 717/25; 717/26

(58) Field of Classification Search .......... 709/204, 709/220, 221, 223, 224, 226, 246, 205, 227; 714/25, 26, 31; 707/10, 101; 345/705, 329, 345/330, 336, 338
See application file for complete search history.

(56) References Cited

U.S. PATENT DOCUMENTS

| 5,107,500 A | | 4/1992 | Wakamoto et al. ........ 371/15.1 |
| 5,581,664 A | | 12/1996 | Allen et al. ................ 706/11 |
| 5,664,093 A | | 9/1997 | Barnett et al. ........ 395/183.07 |
| 5,678,002 A | | 10/1997 | Fawcett et al. ........ 395/183.01 |
| 5,701,399 A | | 12/1997 | Lee et al. .................. 706/11 |
| 5,742,773 A | * | 4/1998 | Blomfield-Brown et al. ........................ 709/228 |
| 5,754,766 A | | 5/1998 | Shaw et al. ............. 395/200.3 |
| 5,787,234 A | | 7/1998 | Molloy ........................ 706/46 |
| 5,790,780 A | * | 8/1998 | Brichta et al. ................ 714/46 |
| 5,861,884 A | * | 1/1999 | Fujioka ........................ 345/705 |
| 5,877,757 A | * | 3/1999 | Baldwin et al. ............. 345/705 |
| 5,878,415 A | | 3/1999 | Olds ............................ 707/9 |
| 5,884,032 A | * | 3/1999 | Bateman et al. ........... 709/204 |
| 5,908,383 A | | 6/1999 | Brynjestad .................. 600/300 |
| 5,918,004 A | | 6/1999 | Anderson et al. ...... 395/183.14 |
| 5,926,624 A | | 7/1999 | Katz et al. .............. 395/200.47 |

(Continued)

OTHER PUBLICATIONS

Replicase, Inc., Self-Healing System 1.0, pp. 1–10.

(Continued)

*Primary Examiner*—Khanh Dinh
(74) *Attorney, Agent, or Firm*—Campbell Stephenson Ascolese LLP; D'Ann Naylor Rifai

(57) ABSTRACT

A method for automated technical support in a computer network having a client machine, and at least one server from which live help is available. The method begins initiates a guided self-help session in response to entry by a user of a problem area and description. During the self-help session, the user is provided with an option to escalate to live help. If the user exercises that option, the system automatically provides a support engineer at the server with a data stream summarizing the self-help session. During the live help, the support engineer may then repeat a portion of the user's self-help session, view information generated during that session, and/or execute certain actions with respect to the user's machine, all from the engineer's desktop. An active journal is maintained for each problem incident, and active journals may be used by other analysts to facilitate problem resolutions for new incidents.

21 Claims, 15 Drawing Sheets

U.S. PATENT DOCUMENTS

| | | | |
|---|---|---|---|
| 5,941,947 A | 8/1999 | Brown et al. | 709/225 |
| 5,944,839 A | 8/1999 | Isenberg | 714/26 |
| 5,983,234 A | 11/1999 | Tietjen et al. | 707/103 |
| 5,983,364 A | 11/1999 | Bortcosh et al. | 714/25 |
| 5,983,369 A | 11/1999 | Bakoglu et al. | 714/46 |
| 5,992,737 A | 11/1999 | Kubota et al. | 235/380 |
| 5,995,956 A | 11/1999 | Nguyen | 706/54 |
| 6,014,651 A | 1/2000 | Crawford | 705/400 |
| 6,026,500 A | 2/2000 | Topff et al. | 714/26 |
| 6,041,323 A | 3/2000 | Kubota | 707/5 |
| 6,145,096 A * | 11/2000 | Bereiter et al. | 714/25 |
| 6,167,395 A | 12/2000 | Beck et al. | 707/3 |
| 6,170,011 B1 | 1/2001 | Macleod Beck et al. | 709/224 |
| 6,170,065 B1 | 1/2001 | Kobata et al. | 714/7 |
| 6,177,932 B1 | 1/2001 | Galdes et al. | 345/329 |
| 6,185,606 B1 | 2/2001 | Bereiter | 709/206 |
| 6,195,426 B1 | 2/2001 | Bolduc et al. | 379/266 |
| 6,195,666 B1 | 2/2001 | Schneck et al. | 707/513 |
| 6,195,763 B1 | 2/2001 | Mayer et al. | 714/25 |
| 6,205,579 B1 | 3/2001 | Southgate | 717/11 |
| 6,219,667 B1 | 4/2001 | Lu et al. | 707/9 |
| 6,219,719 B1 | 4/2001 | Graf | 710/1 |
| 6,230,287 B1 | 5/2001 | Pinard et al. | 714/31 |
| 6,236,989 B1 | 5/2001 | Mandyam et al. | 707/4 |
| 6,237,114 B1 | 5/2001 | Wookey et al. | 714/47 |
| 6,240,420 B1 | 5/2001 | Lee | 707/102 |
| 6,256,620 B1 | 7/2001 | Jawahar et al. | 707/2 |
| 6,260,048 B1 | 7/2001 | Carpenter et al. | 707/104 |
| 6,279,125 B1 | 8/2001 | Klein | 714/38 |
| 6,298,457 B1 | 10/2001 | Rachlin et al. | 714/49 |
| 6,321,348 B1 | 11/2001 | Kobata | 714/37 |
| 6,347,234 B1 * | 2/2002 | Scherzer | 455/562.1 |
| 6,477,531 B1 * | 11/2002 | Sullivan et al. | 707/10 |
| 6,542,898 B1 * | 4/2003 | Sullivan et al. | 707/102 |
| 6,584,496 B1 * | 6/2003 | Ludtke | 709/217 |
| 6,615,240 B1 * | 9/2003 | Sullivan et al. | 709/205 |
| 6,658,598 B1 * | 12/2003 | Sullivan | 714/25 |
| 6,694,314 B1 * | 2/2004 | Sullivan et al. | 707/10 |

OTHER PUBLICATIONS

Full Circle Software, Inc., Talkback Whitepaper, Jul. 1998, pp. 1-7.
Cybermedia, First Aid, Oct. 1998, pp. 1-6.
Aveo, The Attune System, Oct. 1998, pp. 1-6.
SystemSoft Corporation, System Wizard™—The-End-To-End Solution, 1997-1998, 10 pages.

* cited by examiner

MOTIVE COMMUNICATIONS
FIRST IN SUPPORT CHAIN AUTOMATION

Enter your query below:

[ search string ~90 ~88 ]  [ Search ]

Tips for searching

☐ Use Free-Text Query

Alerts and Late-Breaking Information
- ☐ Alert-alert

Current Category: ☐ top

SubCategories
- ☐comp
- ☐jdirect
- ☐Duke's
- ☐Bill's
- ☐Jeremy
- ☐Mike's
- ☐sanjay
- ☐enrico
- ☐Corey
- ☐Category
- ☐testing
- ☐Self Help
- ☐This is a test
- ☐Test Cat
- ☐Jerry
- ☐Omar
- ☐Solaris
- ☐Outlook Express
- ☐New Category

Active Content for the Current Category

91 —
- FAQ - nbn
- Release Note - Test Release Note
- Support Note - Guided support for Outlook Express
- FAQ - New FAQ ©1997-1998 Motive Communications. None of the text or images on this page may be reproduced without the express written consent of Motive Communications. All rights reserved.

*FIG. 7*

MOTIVE COMMUNICATIONS
FIRST IN SUPPORT CHAIN AUTOMATION
Search Results

Documents 1 to 1 of 1 matching the query "wwintl32.dll".

1. <u>Support Note: Wrong Wwintl32.dll Error</u>
   *Abstract*: Wrong Wwintl32.dll Error. Problem. Solution. Support Note:. The information in this article applies to: Microsoft Word 97 for Windows, Service Release 1 (SR-1) SYMPTOMS: When you attempt to start Microsoft Word after you have run the Microsoft Office 97 Service Release 1 (SR-1) Patch, you may receive the following error message:
   *size 3,571 bytes - 10/2/98 12:21:04 PM GMT*

*The index is up-to-date.*

Page 1 of 1

© 1997-1998 Motive Communications.  All rights reserved.

*FIG. 8*

MOTIVE COMMUNICATIONS
First In Support Chain Automation
💡 *Support Note:*
Wrong Wwintl32.dll Error

Problem

🔍 Diagnose

The information in this article applies to:

* Microsoft Word 97 for Windows, Service Release 1 (SR-1)

SYMPTOMS: When you attempt to start Microsoft Word after you have run the Microsoft Office 97 Service Release (SR-1) Patch, you may receive the following error message:

The wrong WWINTL32.DLL has been loaded.

CAUSE: This error message occurs when the versions of the Winword.exe file and the Wwintl32.dll file are not the same.

NOTE: It is not sufficient to check the file version information that is displayed when you right-click the program icon and click Properties on the shortcut menu.

This problem may also occur if a wwintl32.dll file is located in the Windows/System directory.

Solution

🛠 Fix

When you install the SR-1 Patch, the Winword.exe or the Wwintl32.dll files are not properly updated. Select the Motive Fixit icon lower to resolve this problem.

More Background: The following table shows the file size and date of the Winword.exe file installed by Word 97 or the Word 97 SR-1 Patch.

| Version | File Size | Date |
|---|---|---|
| Word 97 | 5194 KB | 11/17/96 |
| Word 97 SR-1 Patch | 5200 KB | 7/11/97 |

The default location for the Winword.exe is the C:\Program Files\Microsoft Office\Office folder.

The following table shows the file size, date and location of the Wwintl32.dll file installed by Word 97 and the Word 97 SR-1 Patch.

| Version | File Size | Date |
|---|---|---|
| Word 97 | 1131 KB | 11/17/96 |
| Word 97 SR-1 Patch | 1132 KB | 7/11/97 |

The default location for the Wwintl32.dll file is the following:
C:\Program Files\Microsoft Office\Office

*FIG. 9*

MOTIVE COMMUNICATIONS
FIRST IN SUPPORT CHAIN AUTOMATION

Active Self-Service Results

You have this problem. The version of the installed library Wwintl32.dll is not correct. Select the fix it diagnostic to resolve this issue.

Related Links

This Motive diagnostic session suggested the following related links:

Main Microsoft Office Site

Related Information

This Motive diagnostic session suggested some hints that should turn up some relevant related information. Click on the View Related Information button if you want to view this related information.

[ View Related Information ]

---

Need Live Help? Since answers to many known problems can be found here, we encourage you to continue using our self-service system. However, if you are not able to locate the answer to your problems, and want to work with a live support engineer, click here, and someone will help you as soon as possible.

*FIG. 10*

MOTIVE COMMUNICATIONS
FIRST IN SUPPORT CHAIN AUTOMATION

Active Self Service Results

The version of the installed library Wwintl32.dll has been updated. You should be able to use Microsoft Word for Windows now.

Related Links

This Motive diagnostic session suggested the following related links:

Main Microsoft Office Site

Related Information

This Motive diagnostic session suggested some hints that should turn up some relevant related information. Click on the View Related Information button if you want to view this related information.

[ View Related Information ]

Need Live Help? Since answers to many known problems can be found here, we encourage you to continue using our self-service system. However, if you are not able to locate the answer to your problems, and want to work with a live support engineer, click here, and someone will help you as soon as possible.

*FIG. 11*

TECHNICAL SUPPORT CHAIN AUTOMATION WITH GUIDED SELF-HELP CAPABILITY, ESCALATION TO LIVE HELP, AND ACTIVE JOURNALING

This application is a continuation-in-part of prior copending application Ser. No. 09/215,873, filed Dec. 18, 1998 now U.S. Pat. No. 6,615,240.

This application contains subject matter that is protected by copyright.

BACKGROUND OF THE INVENTION

1. Technical Field

The present invention relates generally to automated customer support and service in a distributed computing environment and more particularly to a method of reducing a number of "live" support calls by providing intelligent, guided self-help in such an environment.

2. Description of the Related Art

Technical support services and programs are designed to diagnose and solve hardware or software problems that users and/or customers encounter as they use computers. As businesses continue to move on-line, distributed computing environments become more complex and, thus, more difficult to troubleshoot. Indeed, entire businesses now desire to connect their critical business systems directly to employees, customers, vendors and other important constituencies. To this end, many internal or external business network applications are now being connected to the Internet's World Wide Web to make the information accessible from anywhere using conventional browser software.

Traditional technical support centers place their emphasis on internal tracking and productivity tools, such as problem tracking systems. Such "back end" systems exist internally to the support organization and are usually transparent to the customer. Although back-end systems aid internal efficiency, they do little for the actual problem resolution process itself. Problem resolution is typically left to telephony-based technologies such as agent-based automatic call distribution (ACD) support centers and intelligent voice response (IVR) devices.

Such techniques attempt to diagnose and address problems on a remote node without actually having the technician travel to that node. The most common method of technical support is still a telephone conversation with tech support personnel. Other known techniques involve a network "login" to the remote node so that the conditions may be evaluated from the technical support center's viewpoint. The network connection may be used to run a diagnostic program on the remote node, or "self-help" fix-it programs may be downloaded to the remote note and executed there.

With the explosive growth of the Internet, yet another approach has become quite popular. This approach involves having the user access a Web server with support content in the form of support notes or FAQs. The user attempts to use this information to "self service" his or her own problem. On its face, this strategy appears sensible as, theoretically, an effective self-service strategy would let users solve problems for themselves (e.g., through a Web browser), with the result of lower call volumes and better service. Unfortunately, however, using the Web as a publishing medium has not resulted in the desired benefits. Indeed, call avoidance has often evolved into "customer avoidance". In particular, most normal users do not want to be "detectives" who have to make a set of guesses about the precise search strings that will get them to the right support solutions. Further, it is quite frustrating for users who cannot solve their problems (by self-service) to then be forced to go through the tedious exercise of later repeating to a support engineer information concerning their self-service attempts. The result is that end users often feel like their vendor is trying to push them away, with the inevitable result that this unintended result may actually occur.

Indeed, studies have shown that, even when a user knows an answer exists to his or her problem, he or she will be able to find the answer only 40% of the time. Further, many "answers" have very complex diagnoses and resolutions that are well beyond the capabilities of most computer users.

The present invention addresses this problem.

BRIEF SUMMARY OF THE INVENTION

It is a primary object of this invention to provide dynamic, guided self-help in a technical support chain automation system. "Guided" support means the system guides the user to find an answer to his or her technical support question or problem. The approach is "dynamic" because the system preferably refines its suggestions as more data and information is gathered from either the user, the user's system, or from a content database.

It is another primary object of this invention to provide intelligent self-help wherein the system, as opposed to the user, develops the appropriate search strategies to enable the user to be guided to an appropriate subset of relevant support notes. Preferably, these strategies are developed automatically during a self-help session by having the system capture the live context of the user's computer.

It is still another object of this invention to provide an active self-help mechanism by which a user can automate time-consuming self-diagnosis and self-repair tasks. For example, with the present invention, the automated technical support system can automatically check a user's computer to determine whether a specific hardware or software conflict exists and then automatically resolve that conflict, e.g., from a support note.

Yet another object of this invention is to simplify the support process in the situation where the self-help has not succeeded satisfactorily and escalation to a support center is necessary. In this situation, the invention provides a mechanism for transferring (from the user's system to the support center server) information about all user attempts to solve the problem. Thus, when the support problem escalates, the past history of the user's attempts to rectify the problem is immediately visible to the support engineer to provide a valuable head-start in diagnosis and repair, without forcing the user to repeat any steps.

These and other objects of this invention are provided in a method, system and computer program product for automated technical support in a computer network having a client machine and at least one technical support server. When the user desires technical support, a technical support interface is launched. The user is then prompted to select a general problem area. In response to a user query, the system automatically serves a self-help home page (or template) to the user's interface. Preferably, the interface has a Web browser navigation metaphor to provide the user with a comfortable and intuitive interaction with the self-help system.

According to the invention, the self-help home page includes a search field that is populated automatically with a system-supplied, self-help search string. This function obviates the user having to make a set of guesses about the precise search string or strings that will direct the user to the right support solution(s). The search string is a value that, when fed into the technical support server's search engine, should produce relevant hits. In the preferred embodiment, the search string is generated dynamically through the use of a diagnostic map that executes on the client machine when the self-help session is initiated. The diagnostic map examines the client system (including the existing applications, registry information and the like) and communicates with the technical support server to derive the search string as a background task. Diagnostic maps are programmable, reusable objects that allow technical support engineers (SEs) and others to write custom tools for diagnosing problems.

If the user elects to execute a search (or, alternatively, a diagnostic map initiates a search automatically), a search results template is returned. If the search returns relevant results, the results template includes a link to a support note. Upon selection of the link, the user is navigated to an "activated" page. The activated page provides the user an option to automatically diagnose the problem (if necessary) and/or the option to fix the problem (if it has been adequately diagnosed and a fix is available). After the user selects the appropriate option, the system returns an active self service results page reporting on the result of the user's action.

Thus, according to an aspect of the present invention, guided self-help is facilitated through use of so-called "active content" pages. Active content is Web-based content (i.e., content viewable by a Web browser) that has one or more diagnostic maps initiated when certain actions are taken (e.g., selecting a link, clicking a button, or the like). In an illustrative embodiment, a given diagnostic map is associated with a page via a URL, although any convenient mechanism may be used to associate a page and a map. When that URL results from selecting a link or button on the Web page, a Web server supporting the support chain automation system has extensions that recognize it as a map (rather than, for example, a reference to another Web page). The active content functionality of the invention enables the user to determine if a particular technical problem described by an external page applies to the user's actual system. This provides a robust self-service capability.

At customizable points during the self-help navigation, the user is given the option to escalate to live-help (e.g. an SE located at the technical support server). When the user selects this option, information about the user's self service efforts is provided to the technical support server automatically so that the user does not need to repeat or otherwise describe to the SE those actions that have already been considered or tried.

When the guided support is complete, whether successful in the first instance or through escalation to live-help, the information about the incident is passed on to the technical support server for reporting and analysis purposes.

During a live help session, the support engineer may access and review the same self-help pages reviewed by the user during the self-help session. The support engineer may also repeat, against the user's machine, all or part of the self-help session to facilitate diagnosis and repair of the technical problem. In this manner, the SE can use the self-help functionality to find a diagnostic map, run a diagnostic map, or point a user to a resource (e.g., a URL) that, upon activation, executes a diagnostic map. Thus, according to this aspect of the invention, the same self-help content (or portions thereof) used to guide the user during the guided self-help session are used at the support center to guide the support technician to a solution from within the context of the technician's desktop.

According to the present invention, an active journal is maintained for each problem incident, and active journals may be used by other analysts to facilitate problem resolutions for newly-reported incidents.

Self service is automatic, context-based, intelligent and captures diagnostic information for further use by the technical support center if necessary. The invention also automates self-diagnosis and self-repair.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description.

BRIEF DESCRIPTION OF THE DRAWINGS

For a more complete understanding of the present invention and the advantages thereof, reference should be made to the following Detailed Description taken in connection with the accompanying drawings in which:

FIG. 7 is a representative screen display of a self-help home page that is rendered to the user with a system-supplied self-help search string;

FIG. 8 is a representative screen display of a search results template that is generated in response to a user's activation of a search;

FIG. 9 is a representative screen display of an activated page returned in response to a user's selection of a link in the search results template;

FIG. 10 is a representative screen display of an active self-help results page returned in response to the user selecting a Diagnose option in the activated page of FIG. 9;

FIG. 11 is a representative screen display of an active self-help results page returned in response to the user selecting a Fix option in the activated page of FIG. 9;

DETAILED DESCRIPTION OF THE PREFERRED EMBODIMENT

Figure 1:
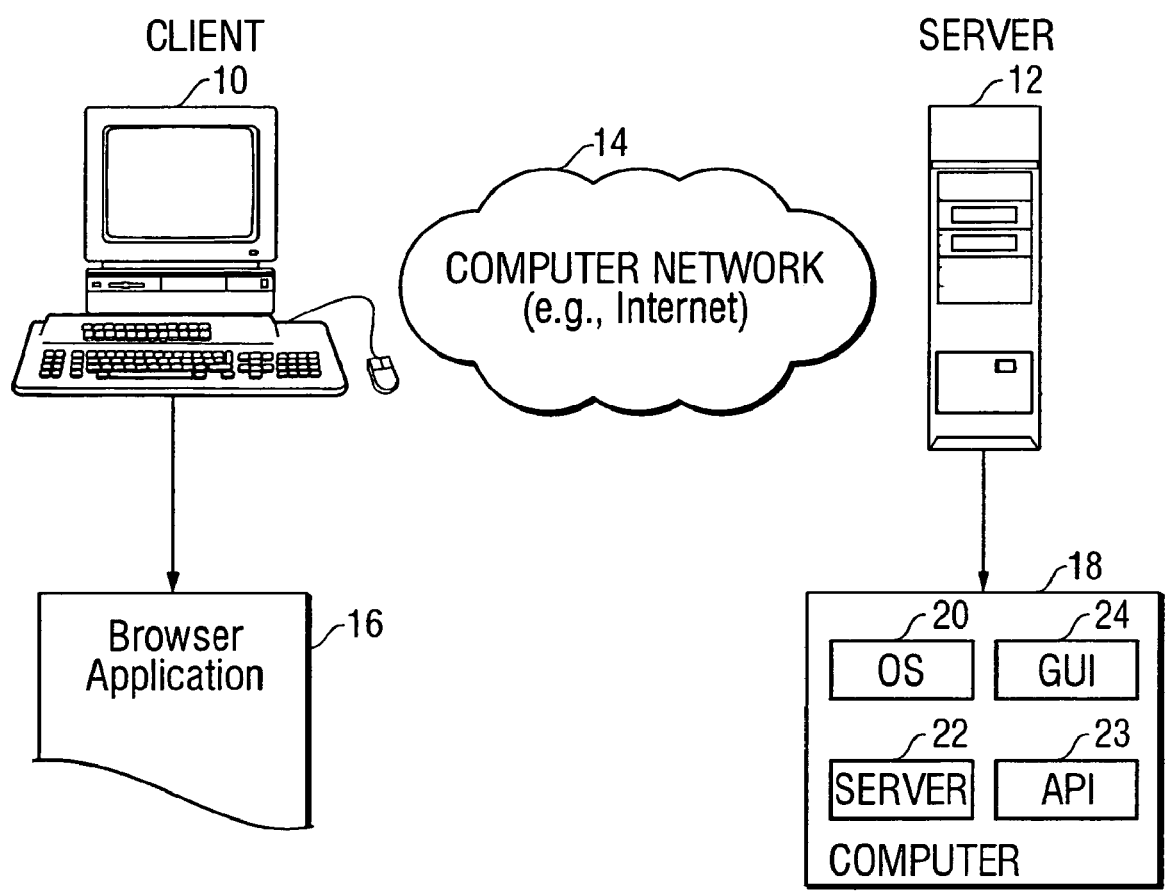
FIG. 1 is a block diagram of a representative Web client and server network environment in which the present invention may be implemented.

The present invention is implemented conveniently in an Internet or Web-based computer network, although this is not a requirement. Thus, by way of background, a representative Web client/Web server is illustrated in FIG. 1. In particular, a client machine 10 is connected to a Web server platform 12 via a communication channel 14.

As will be described, the invention assumes that a user of the client machine 10 has experienced a problem and desires automated technical support. According to the invention, the user may attempt to solve the problem through a guided "self-help" process as will be described, or he or she may seek "live-help" from a technical support engineer (SE) located at the server platform (or at some other server), or the user may first attempt self-help and then escalate to live-help as needed.

For illustrative purposes, channel 14 is the public Internet, an intranet, an extranet or any other known network connection. Web server platform 12 is one of a plurality of servers which are accessible by clients, one of which is illustrated by machine 10. A representative client machine may include a Web browser 16, which is a known software tool used to access the servers of the network. The Web server platform supports files in the form of hypertext documents, graphics and other data type objects. The network path to a server (or to a file on the server) is identified by a Uniform Resource Locator (URL), and is well-known.

A representative Web Server platform 12 comprises a Compaq® computer 18 running the Windows NT Operating System 20 and a Web server program 22, such as Netscape Enterprise Server Version 3.51, that supports interface extensions. The platform 12 also includes a display supporting a graphical user interface (GUI) 24 for management and administration, and an Application Programming Interface (API) 23 to enable application developers to extend and/or customize the core functionality thereof through software programs such as servlets, CGI scripts, helper programs and plug-ins.

A representative Web client is a personal computer that is x86-, PowerPC®- or RISC-based, that includes an operating system such as Microsoft Windows '95 or NT, as well as a browser, such as Netscape Communicator (any version) or Internet Explorer (any version), having native support for application plug-ins. The Web client machine is connectable to the Web server(s) via the Internet, an intranet or some other computer network. The Web client browser typically includes a Java Virtual Machine (JVM), which provides a convenient runtime environment for programs written as Java applications or applets.

Although not required, the self-help functionality of the present invention is preferably implemented as a Java application or applet (i.e. a set of Java program instructions or code) that is dynamically downloaded to the user's machine for execution. Of course, the inventive self-help application (whether implemented in Java or otherwise) may simply reside on the user's machine. Some of the functionality described herein may be implemented on a server (e.g., as a servlet) and then delivered to the client as needed.

Although the Web client is typically a personal computer, this is not a requirement. The Web client may be any generalized information appliance having a processor, an operating system, optionally a browser application, and a means to connect the device to a computer network from which data may be retrieved. Such appliances include, without limitation, a handheld or palmtop device (e.g., running Windows CE 2.0 or higher), a diskless or so-called "network computer", a set-top computer terminal, or the like.

Figure 2:
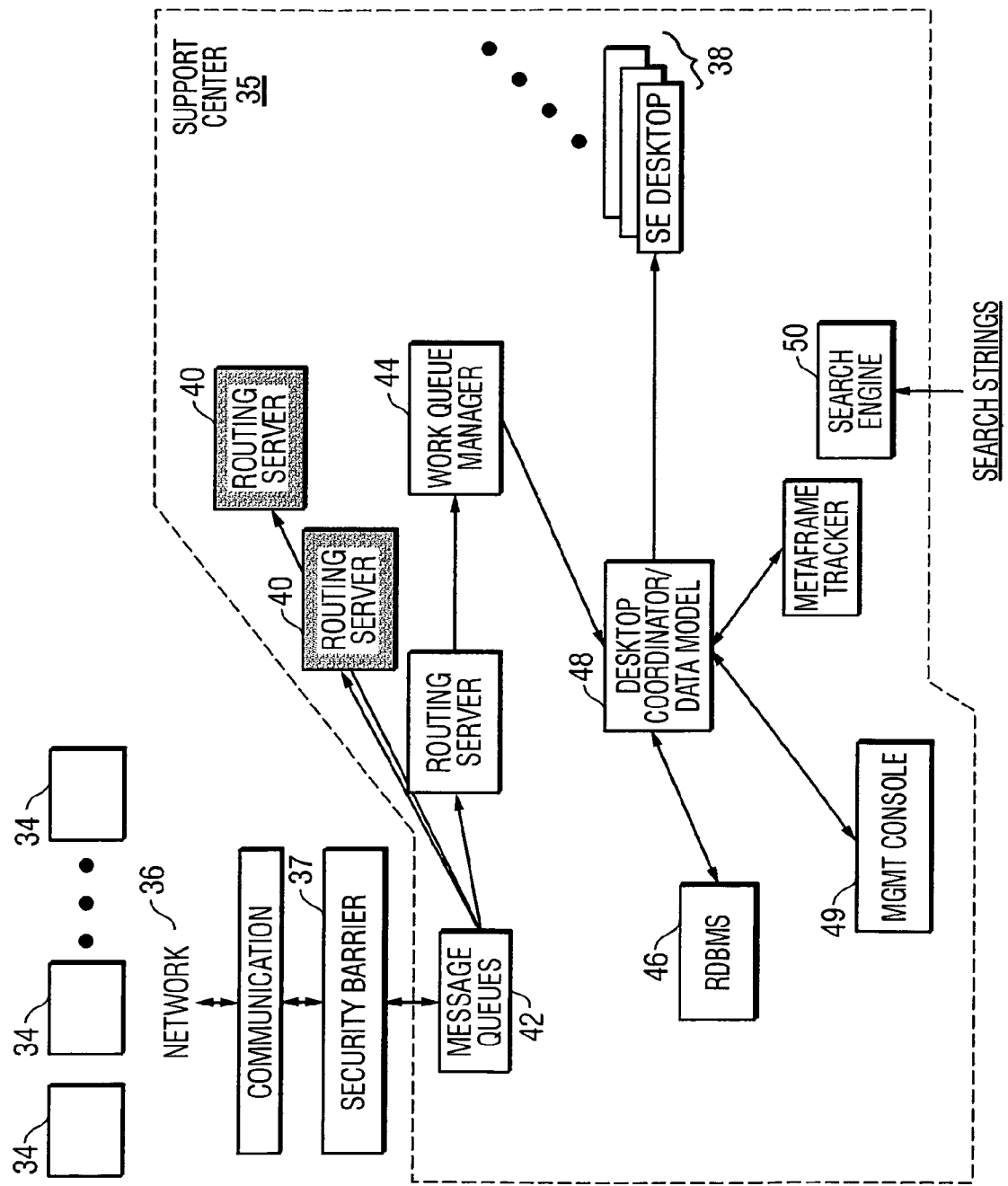
FIG. 2 is a block diagram illustrating the architecture of a technical support chain automation system is which the self-help function of the present invention is implemented.

Although numerous system architectures may be used to implement the inventive technique, one such architecture is illustrated in FIG. 2. This architecture is implemented, for example, in a corporate enterprise environment (such as an intranet), wherein a plurality of client machines (desktops) 34 interface with a support center 35 located at a server node through a network 36. The clients are the desktop machines used by the community of application end users. These are the users who use applications, encounter problems, and seek help. Typically, client machines 34 are separated from the network 36 via a firewall 37. Each client machine may include conventional browser software as discussed above. The server node may have associated therewith a set of one or more support engineer (SE) desktops 38 at which technical support personnel reside.

Under certain circumstances as will be described, a user of a given client machine may undertake to solve a particular problem normally requiring technical support through a self-help (or self-service) process. Typically, such technical support and service is provided in an automated manner, without necessarily connecting the user/customer to a support engineer via an audio or on-line link. In this environment, given interactions between a user (and, in particular, the user's computer) and an SE may occur without the user's actual knowledge or without any direct communication.

The diagnostic center 35 preferably comprises a number of functional components that are now described. The center includes one or more routing servers 40, and each routing server's primary responsibility is to route a given data set to a best-equipped support engineer to handle the call if live-help is required. To this end, information in the data set preferably is matched up against help desk "rules" to determine which group or person should handle the problem. Preferably, the routing server 40 attempts to assign data sets to a most appropriate message queue 42 (and thus, indirectly, to a most appropriate support engineer). Given support engineers preferably belong to a set of "groups," with each having an associated message queue 42 of assigned data sets. A given support engineer obtains ownership of a given data set from his or her respective queue until the session is complete or the call is reassigned to some other group. A work queue manager 44 is responsible for managing the message queues 42.

In addition to performing routing, communications, and data packaging services, the diagnostic center also supports the server portion of the automated support application. The server portion comprises a database server (e.g., a commercially available relational database management system (RDBMS)) 46 and an application server 48. A representative RDBMS is available from Oracle, Microsoft or others. The application server 48 provides a set of services to keep the support engineer desktops up-to-date as well as to provide general services to the application back-end. A given server also has (or has access to) a search engine 50 to facilitate searching for known technical support solutions.

Thus, the diagnostic center routes incoming calls (that require live help) to the best call group queue, provides services to the SE desktops, provides services to the support center management console 49, and interfaces to third party products/systems that store configuration data and track results. The management console is a mission control for support center activities. Preferably, the console 49 has both data display and system configuration capabilities. The data displays are both real-time and historic views into the call center metrics, and the configuration dialogs are used to set operational characteristics of the server. A convenient browser-based or other user interface may be used for this purpose.

Figure 3:
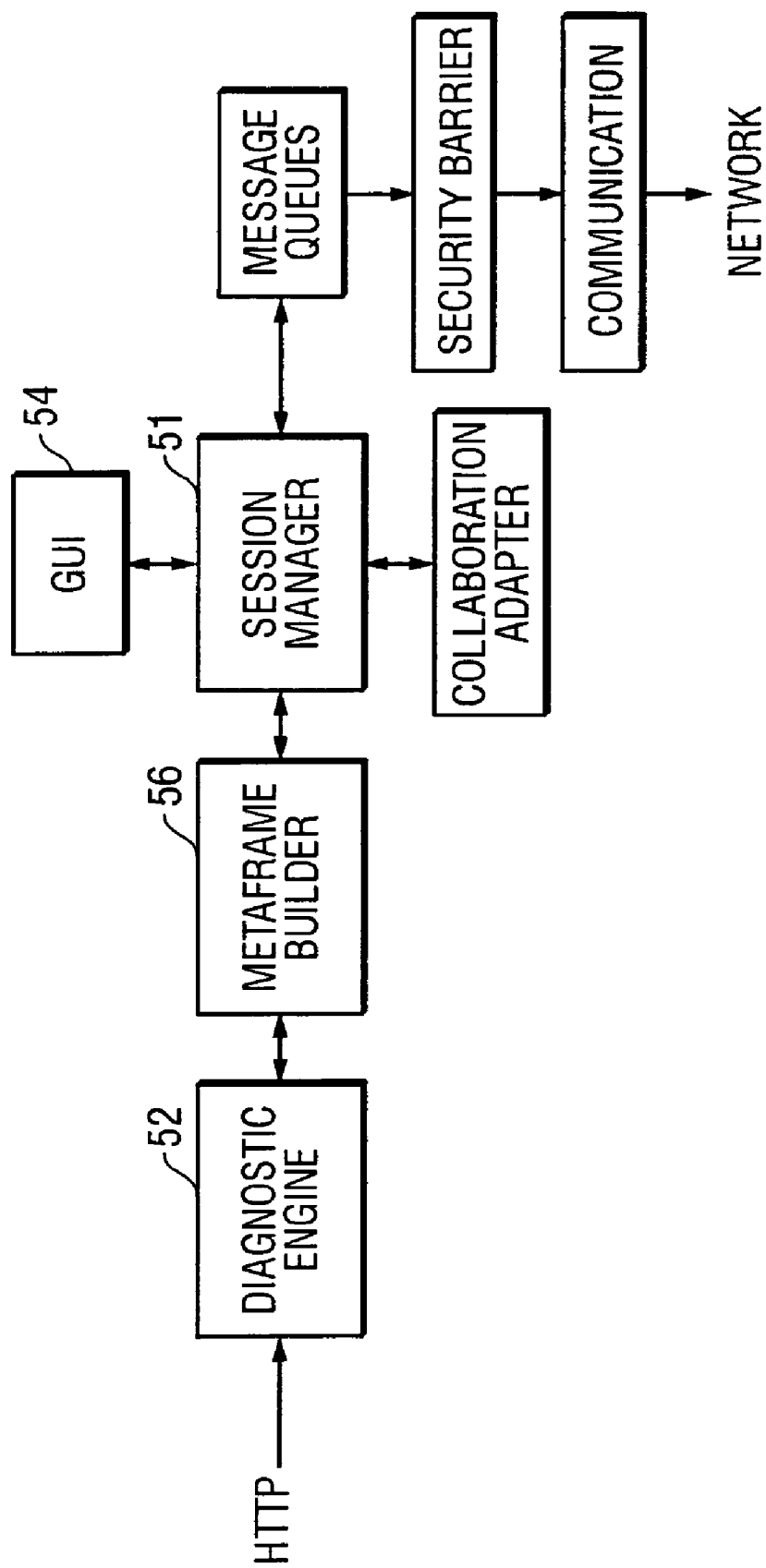
FIG. 3 is a block diagram of the components of the technical support chain automation system implemented on a client machine.

A block diagram of the "client" piece of the automated technical support chain automation system is illustrated in FIG. 3. The client piece executes on the client machine 10 (on which the technical problem has arisen) to perform an initial diagnosis in response to a given occurrence (e.g., a PANIC), to facilitate user self-help (as will be described), to submit the diagnosis to the diagnostic center, and to collaborate with the server components in the center to perform further tests, preferably in an iterative manner, and, if possible, to make repairs. One such iterative distributed problem solving technique is described in Ser. No. 09/073,464, titled "Method, System and Computer Program Product For Iterative Distributed Problem Solving," assigned to the assignee of this invention. That application is incorporated herein by reference.

The major client components include a session manager 51, a diagnostic engine 52 and a graphical user interface (GUI) 54. The session manager 51 takes the initial diagnosis (using a diagnostic map), submits it to the server, tracks open problems, and coordinates the flow of information between the client and the support center. The diagnostic engine is a core piece of code that diagnoses problems and collects data as defined by the diagnostic map(s). It cooperates with a data set builder 56 to create data sets, and it works together with the session manager 51 to forward such data sets to the diagnostic center. The client side GUI 54 may be a simple display icon on the user's desktop that is activated when required by the user seeking technical support. The client GUI 54 may also be used to provide dialog boxes or the like to enable the user to monitor and/or interact during a connection with an SE when live help is required.

In the system illustrated in FIGS. 2–3, all communications are made conveniently over TCP networks, but such communications are not dependent on persistent TCP connections. Instead, a single logical session may span multiple TCP connections. A communications subsystem preferably interfaces the client and diagnostic center, managing the input and output queues, and providing basic network location services. In addition, the system may include a security subsystem as network communications should be secure. Thus, for example, a given data set is preferably sealed to restrict access to the data to those having proper credentials. All operations performed on the client machine preferably must first pass security conditions to ensure that only support engineers authorized by the client may inspect or change the client.

Figure 4:
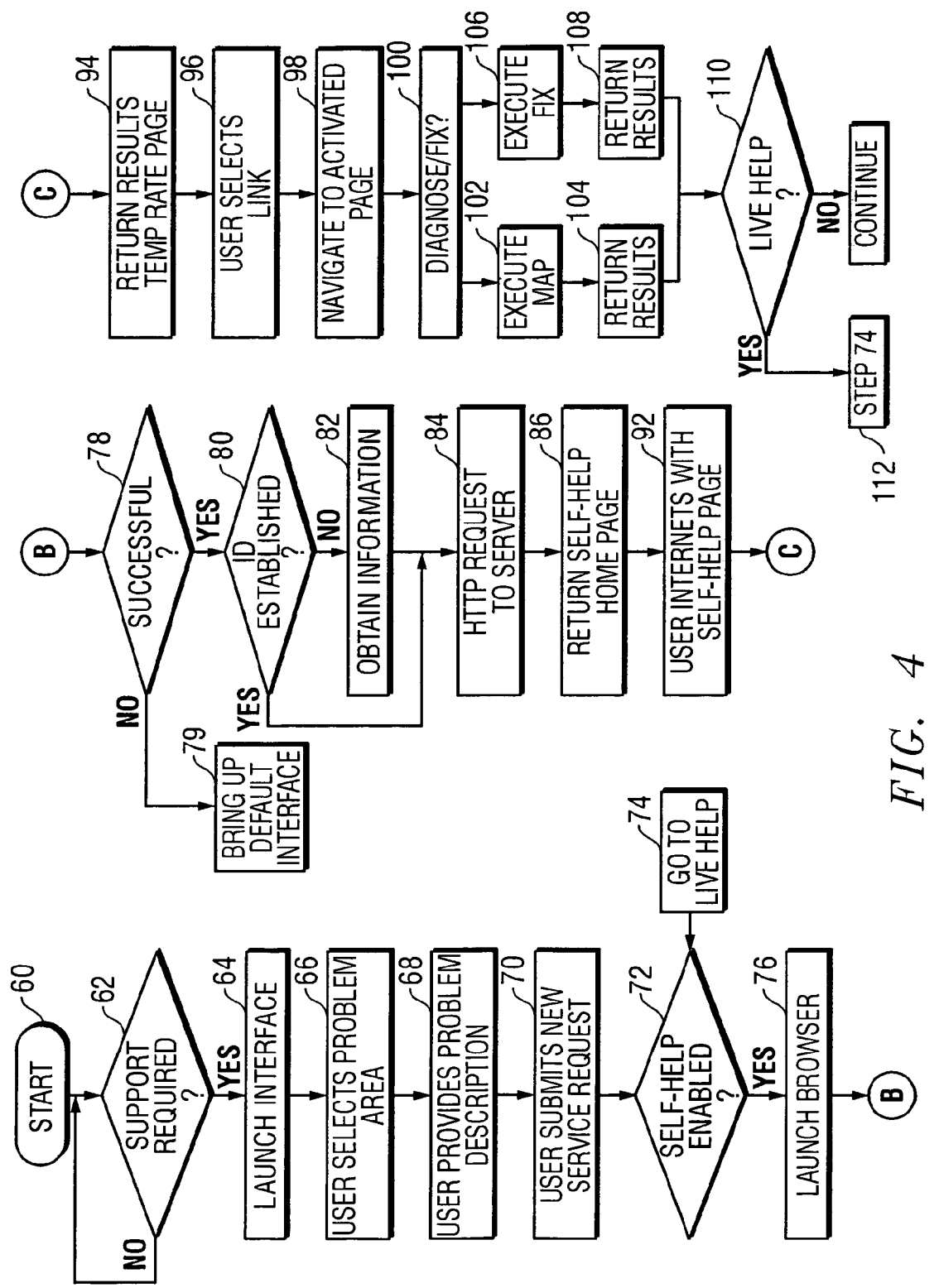
FIG. 4 is a flowchart illustrating a preferred self-help method of automated technical support according to the present invention.

A simplified flowchart showing the inventive self-help technique is illustrated in FIG. 4. In the illustrative example to follow, it is assumed that the user has tried, unsuccessfully, to launch a Microsoft Word application and, instead, he or she has received an error message (e.g., "wwint132.dll error"). The display of this error message has prompted the user to request technical support.

Several of the steps described and illustrated are provided by way of background or context and should not be taken to limit the invention. The routine begins at step 60. At step 62, a test is run to determine whether the user requires automated technical support. If not, the routine cycles. If, however, the user has indicated his or her request for technical support (e.g., by double clicking an icon in a UI support tray), the routine continues at step 64 to launch the client program code and its associated server interface (sometimes referred to herein as the Motive Assistant™).

Figure 5:
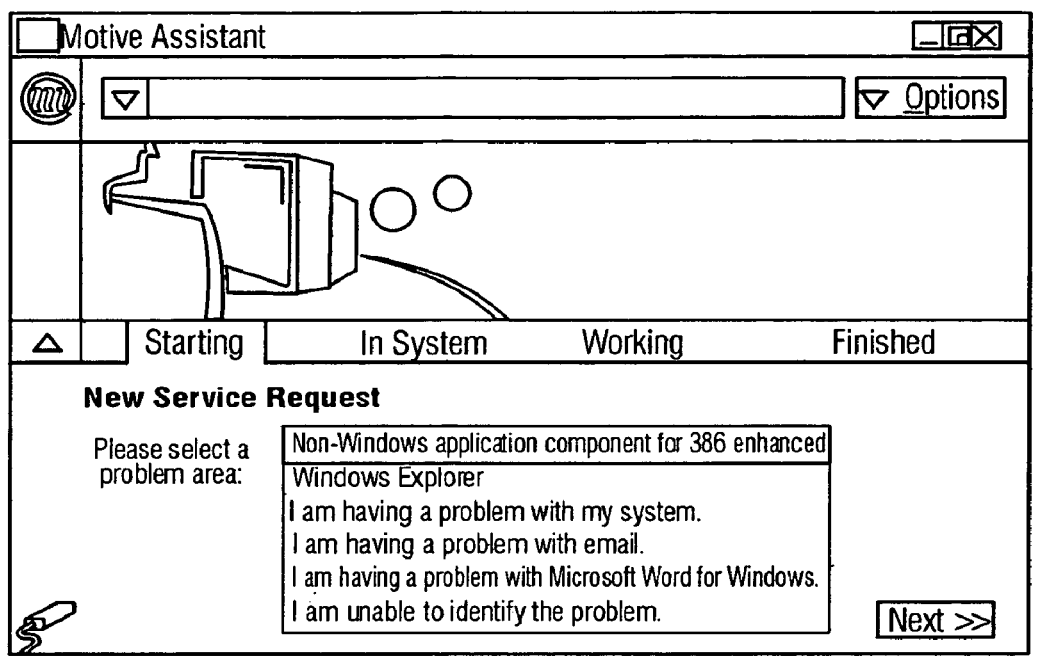
FIG. 5 is a representative screen display of a self-help interface that is launched to initiate an automated technical support session according to the present invention.
Figure 6:
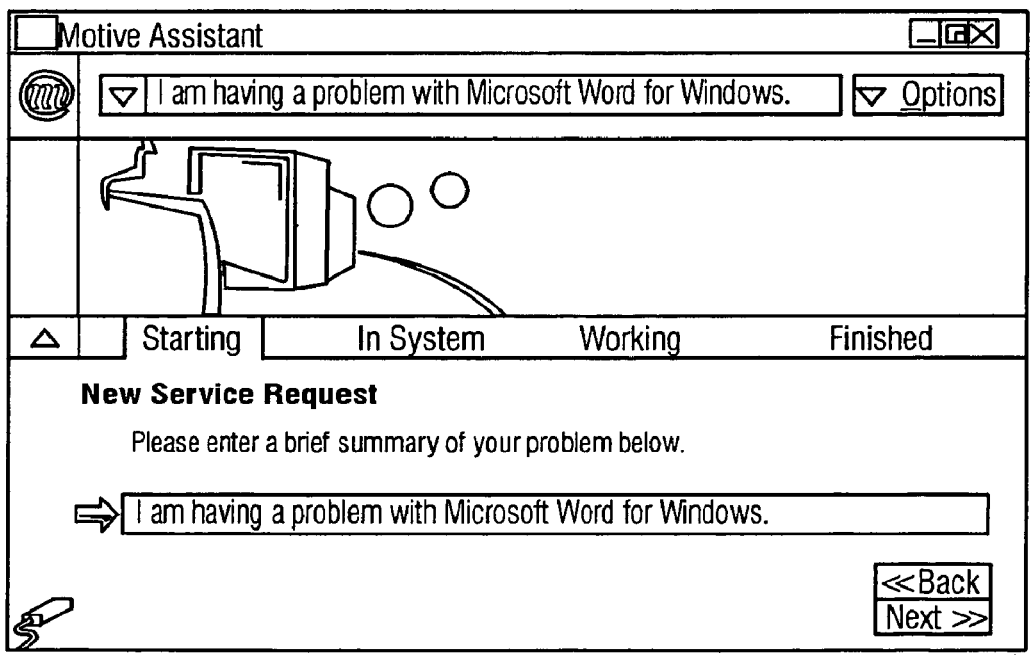
FIG. 6 is a representative screen display panel of the self-help interface.

This operation brings up a technical support interface such as illustrated in FIG. 5. As can be seen, the interface preferably includes a listbox that includes a list of possible "problem areas" that may be selected by the user for a New Service Request. At step 66, the user selects a problem area. At this point, the user may be prompted to provide a brief summary of the problem encountered. This is step 68. An illustrative dialog screen for this step is shown in FIG. 6. Thus, in steps 66 and 68, a problem area and description are entered by the user. These steps may be combined. In the illustrative example, the user is having difficulty starting a Microsoft Word application. At step 70, the user submits the New Service Request with the appropriate information.

A test is then performed at step 72 to determine if the self-help function is enabled. If not, the routine branches to step 74 to provide the current problem to the live-help system (namely, an SE). If, however, the self-help function is enabled, the routine continues at step 76. At this time, the user's default Web browser is launched. A Web browser navigation metaphor preferably is used to provide the user with a comfortable and intuitive interaction with the self-help system, although the self-help UI may be system-configurable. At step 78, a test is performed to determine whether the user's browser has launched. If the outcome of the test at step 78 is negative, the routine skips the self-help process and (at step 78) makes the default interface visible for connecting to live-help.

If, however, the outcome of the test at step 78 is positive, the routine continues at step 80 to test whether the user's identity has been established by the automated technical support system. If not, the routine continues at step 82 to obtain the user's contact information to store such information in a registry. Thereafter, or if the outcome of the test at step 80 is positive, the routine continues at step 84.

In particular, an HTTP request is then made to the automated technical support server. Based on the contact information (as well as other basic parameters such as OS type, values entered by the user in problem submission fields, and the like) passed, the routine then continues at step 86 to serve a self-help home page to the user's default browser. A representative self-help home page, based on the Microsoft Word example previously described, is illustrated in FIG. 7. According to a feature of the present invention, the home page includes a search field 88 that is populated automatically, namely, by the system itself, by a self-help search string 90. The home page is displayed as a starting point to enable the user to attempt to solve the problem at hand. As can be seen, the home page may include Alerts and Late Breaking Information, a link to a Current Category that the problem is associated with, and a set of SubCategories, each with appropriate links. The home page may also include links 91 to so-called "active content" for the Current Category comprising FAQs, Release Notes, Support Notes, and the like. These links help the user search the existing knowledge base.

Thus, according to an aspect of the present invention, guided self-help is facilitated through use of so-called "active content" pages. Active content is Web-based content (i.e., content viewable by a Web browser) that has one or more diagnostic maps initiated when certain actions are taken (e.g., selecting a link, clicking a button, or the like). In an illustrative embodiment, a given diagnostic map is associated with a page via a URL, although any convenient mechanism may be used to associate a page and a map. When that URL results from selecting a link or button on the Web page, a Web server supporting the support chain automation system has special extensions that recognize it as a map (rather than, for example, a reference to another Web page). The active content functionality of the invention enables the user to determine if a particular technical problem described by an external page applies to the user's actual system.

Generalizing, regular HTML-based content is sometimes referred to herein as basic content. It may include FAQs, problem/resolution notes, alerts, how to notes, update notes, as well as other types of support information. "Active content" refers generally to basic content that has been activated with an "activator". An activator is an object that adds intelligence to the basic content. An illustrative activator is a diagnostic map. Active content may also be thought of as basic content that has been activated by attaching one or more diagnostic maps to such content.

Thus, there may be several different types (e.g., FAQ, Alert, Note, etc.) of active content. According to the invention, existing Web site information and Web site look and feel may be incorporated into the technical support server by editing a set of default active content related templates, one for each type. Active content may link to other Web-based content via URLs to provide full function multimedia support notes, "how to" information, and the like.

As noted above and as illustrated in FIG. 7, the page is based on the Web browser metaphor and is template-based for ease of configuration. In particular, the diagnostic center may modify the look and feel of the self-help system to match a given theme, layout or motif.

The search string 90 is a value that, when fed into the technical support server's search engine 50, should produce relevant hits, namely, information for solving the technical problem. In the preferred embodiment, the search string is generated dynamically through the use of a diagnostic map that executes on the client machine. The diagnostic map examines the client system (including the existing applications, registry information and the like) and communicates with the technical support server to derive the search string as a background task, namely, without user input. According to the invention, a given diagnostic map is a programmable, reusable object that allows a technical support engineer (SE) or the others to write custom tools for diagnosing problems.

Although not illustrated in FIG. 7, it should be appreciated that, in some instances, execution of a diagnostic map run during the self-help process produces a self-help answer ("you have problem x") or a self-help URL (or series of URLs) that the user should probably investigate. It should also be noted that the notion of a diagnostic map preferably is not surfaced directly to the user. During the execution of a given map, however, the user may be asked if he or she desires to check for a particular problem, apply a patch, or the like.

Returning to FIG. 4, at step 92, the user interacts with the self-help page by navigating the default browser. In this illustrative example, the user launches the search that has been proposed by the system. Alternatively, the system may launch the search automatically for the user. At step 94, the routine returns a results template page that, in this example, identifies a Support Note link. A representative results template page is shown in FIG. 8. IN this example, the page identifies a Support Note that describes the user's problem (namely, the inability to start Microsoft Word) and the associated error message that prompted the user to initiate the session in the first instance.

Based on the clear relevance of the Support Note, the user selects the link. This is step 96. Upon activation of the link, the routine continues at step 98 to navigate the browser to a so-called "activated page" as illustrated in FIG. 9. A page is said to be activated because it may include active content. As illustrated, the activated page provides the user an option to further diagnose the problem, by selecting a Diagnose button, and/or the option to apply a fix to the problem, by selecting a Fix button. Each of these options has associated therewith additional explanatory text to facilitate the user's selection. At step 100, a test is performed to determine whether the user has selected the Diagnose or Fix button.

The routine branches to step 102 if the user selects Diagnose to execute another diagnostic map. At step 104, the routine then returns and populates a self-help results page such as illustrated in FIG. 10. This page includes appropriate text identifying whether or not the user's system does, in fact, have the problem identified. It may also include related links and information as illustrated. The user may then navigate to the related links and other information.

Alternatively, the routine branches to step 106 if the user selects Fix and executes the required fix. At step 108, the routine returns a self-help results page populated with information confirming the action. Given the previous Microsoft Word example, the self-help results page returned is illustrated in FIG. 11. This page, likewise, may include related links and information.

The self-help results page (in either case) may include a link to live-help. Thus, at step 110, the routine tests to determine whether live-help is requested. If so, the routine branches to step 112 and establishes a live SE connection; otherwise, the routine continues processing the self-help function. This completes the processing.

The technical support system may interact with the user's local machine to execute diagnostic maps using a "mini Web server" process running on the client. Thus, for example, the execute map step 102, among others, may be implemented in this manner. One preferred method for executing a map locally from the client browser begins by sending a special URL to the local mini Web server. The local process authenticates the user, breaks apart the URL to determine which map to run, checks to see if the map is present (and, if not, downloads the map from the system server), "executes" the instructions of the map, collects the resulting XML, and then parses the XML looking for self-service tags to be used for further navigation purposes. Thus, for example, the tags enable the user to navigate to a page that describes the problem or to how to fix the problem. This process is also used to generate the system-supplied search string.

Summarizing, the dynamic search string is built up when the diagnostic map is initially run on the user's system. This string is then fed into the server's search engine, and more relevant search "hits" may result (or, as in the above example, a self-help answer is found). Some of these hits may, in turn, cause other diagnostic maps to run and, in this manner, the user narrows in on the desired solution. Thus, the present invention provides the ability to run a diagnostic map from the client browser during the self-help session, thereby greatly enhancing the user's likelihood of quickly finding the necessary technical solution.

One of ordinary skill will appreciate that by having the system itself create an "expert" search string, the present invention leverages the skill of the original author of the diagnostic map and takes full advantage of the knowledge about the user's then-existing configuration. This provides a local context to the search that provides much more efficient and accurate results, thereby increasing the likelihood of a prompt and successful self-help session.

A diagnostic map run during self-help preferably produces an Extensible Markup Language (XML) metaframe, with sections of the XML filled in with new map APIs:

SetSelfServiceAnswer;
SetSelfServiceURL; and
SetSelfServiceSearchString, which contain information to return meaningful information to the user's Web browser. As the names suggest, three different items can be returned as the result of a map being run:

SelfServiceAnswer—this is the answer that the map obtained. For example, "you have problem x";

SelfServiceURL—this is a URL (or series of URL's) that the user should probably investigate;

SelfHelpServiceString—this is a value that, when fed into the search engine, should produce relevant hits. As noted above, the home page template preferably is used to display these results. However, if no SelfServiceAnswer is present in the map results, and only one of the other self-help fields is present, the template step is skipped. For example, if only the SelfHelpSearchString is present, the results of the search will be presented to the end user.

Because the diagnostic map(s) are run from a Web browser, the results are provided as either HTML or as a redirected URL. Preferably, a status bar shows progress while the map is running and, as noted above, a map can optionally interact with the user via map dialog application programming interfaces (APIs).

The present invention has significant advantages. Rather than forcing an end user to be a detective and to enter a series of search strings while attempting to find a solution, the inventive functionality captures the live context of the user's running system and dynamically guides the user to the appropriate subset of relevant active content. Using one or more diagnostic maps, the system performs an electronic diagnosis of the user's system and facilitates further automated technical support. Thus, for example, the inventive functionality may be used to determine automatically whether a support center alert is applicable to the user's individual system, to provide a user with steps and individualized suggestions for accomplishing a specific task (e.g., customized to the user's operating system, version of software, or the like), to perform a sequence of suggestions automatically if the user so chooses, or to perform automatically electronic repairs, or any other set of tasks that would resolve the user's problem. In this manner, the automated technical support functionality electronically and automatically performs the start-to-finish sequence of tasks in a support procedure that was previously performed manually and repetitively.

The self-help function described above provides numerous further advantages. As can be seen, existing Web information can easily be incorporated via links inside the self-help templates. This includes any Web-based content, including multimedia how-to information, and other knowledge bases. Further, at customizable points during the self-help navigation, the user is given the option to escalate to live-help. When this election is made, the default browser is taken down and the default interface obtains focus for live help. In this case, the default browser already has the relevant problem information and, thus, the correct diagnostic map can be run directly. In particular, the problem is sent to the automated technical support server with the original problem description and the self-help map output (which is preferably formatted as XML).

In addition, when the guided support is complete, whether successful (through self-help) or via escalation to live help, the information about the incident is passed on to the server for reporting and analysis purposes. In this self-help case, the server preferably stores this information where it can be batch processed into the remainder of the diagnostic center at regular intervals.

Preferably, the client side code manages the guided support experience such that the user is provided a consistent and logical user interface as illustrated above. After using self-help and not having been able to resolve the problem, the user may request live help via the client side code. As noted above, when live help is requested, the incident is sent to the server at this time to be routed to a SE queue. All self-help related information is preferably made available to the router for use in making a routing decision.

Figure 12:
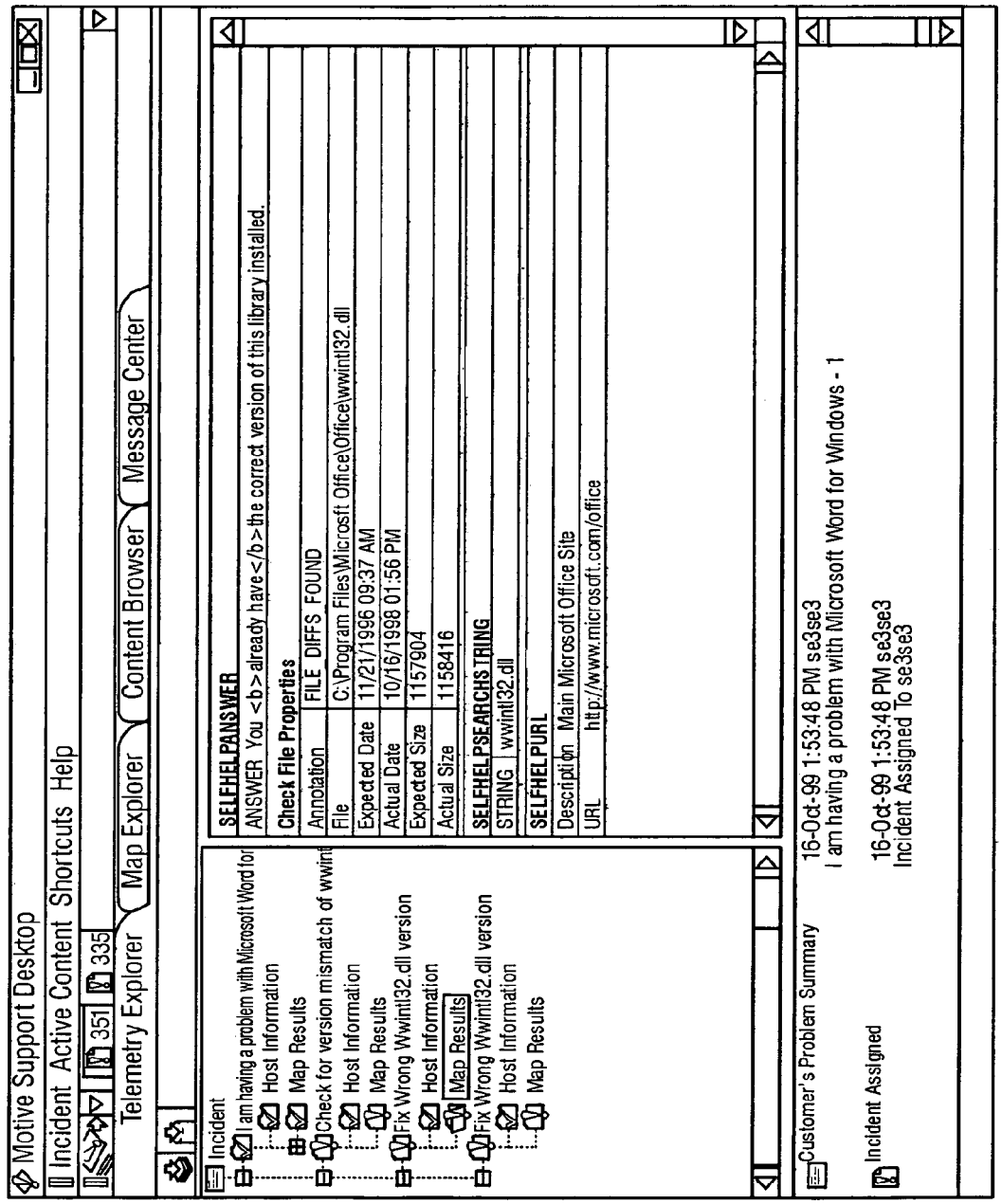
FIG. 12 is a representative screen display of a system analyst's desktop.

Moreover, upon opening an incident report, the telemetry data provided by the client side code summarizes all the self-help actions the user took, including all search strings and those actually traversed. This information is provided preferably in a guided support display group on the analyst's desktop. A representative interface illustrating the information is provided in FIG. 12. The system thus automatically provides all relevant self-help information to the SE and makes that information available for display on the SE's desktop. As a result, the user is not forced to repeat to the SE all of his or her self-help actions.

According to another feature of the present invention, during a live help session, the SE may actually access and review the same self-help pages reviewed by the user during the self-help session. The engineer then may also repeat, against the user's machine, all or part of the self-help session to facilitate diagnosis and repair of the technical problem. In this manner, the SE can use the self-help functionality to find a diagnostic map, run a diagnostic map, or point a user to a resource (e.g., a URL) that, upon activation, executes a diagnostic map. Thus, the same self-help content (or portions thereof) used to guide the user during the guided self-help session may be used at the support center to guide the support technician to a solution from within the context of the technician's desktop. This greatly simplifies and reduces the complexity and burden of the live help session.

Figure 13:
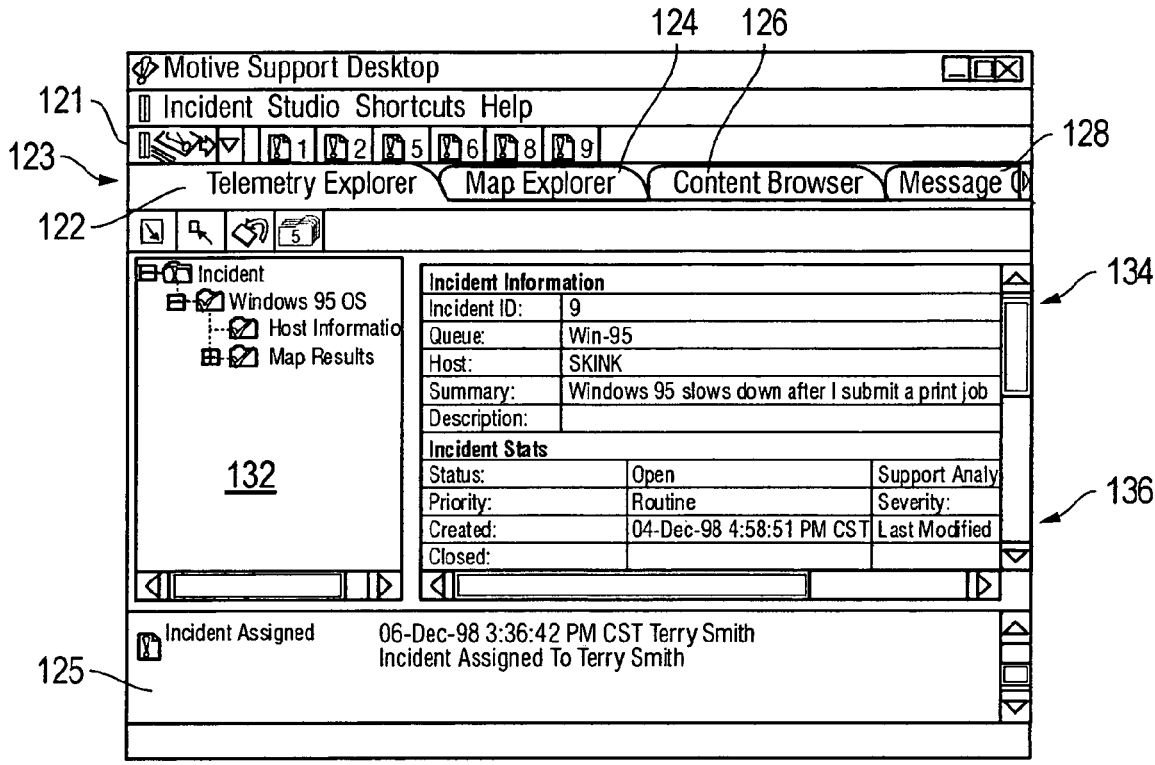
FIGS. 13–14 illustrate the Telemetry Explorer panel of the system analyst's desktop.

FIGS. 13–20 illustrate a preferred embodiment of the support analyst desktop. Referring to FIG. 13, an incident bar 121 contains icons for selecting among the incidents that may be open. The view tabs 123 provide four types of information that may be available for a currently-selected incident. These types include a Telemetry Explorer 122, a Map Explorer 124, a Content Browser 126, and a Message Center 128. Activation of a given view tab displays a given control screen. In FIG. 13, the Telemetry Explorer panel is illustrated. An active journal panel 125 contains a record of activities performed on the selected incident, along with other information placed in the journal by the support analyst. Incidents are created when a user submits a problem to the system.

Turning to FIG. 13 in particular, the Telemetry Explorer panel 122 shows all of the maps that have been run as part of the particular incident being displayed and the telemetry that was collected. The information preferably is categorized and shown in a tree structure for quick navigation. As noted above, telemetry is the diagnostic information collected by the map run on the end user's system. To view the telemetry, the support analyst opens the Telemetry Explorer tab 122 from the default desktop. The left panel 132 shows a hierarchical view of groups, or categories, of information in the telemetry (indicated by folder icons). The top-level of the tree identifies the Incident, the second level identifies the map(s) run (in this case, Windows 95 OS), and the third level identifies the Map Results (namely, the telemetry generated upon execution of the given map). Thus, these categories are defined in the map by display groups or individual commands that return collections of data. Clicking on the +/− boxes expands or collapses the category. Selecting an item in the left panel displays the contents or details of that item in the right panel. The Incident information is grouped into several categories, namely: incident information 134, including incident ID, queue, host name of machine on which the map executed, and a summary statement and description of the problem entered by the user, and incident state 136, including current status of the incident, support analyst assigned, priority and severity level, and the dates when the incident was created, last modified and closed (if applicable). Although not shown, the screen expands, for example, to display customer information such as the end user's name, company name, email address, and the like.

Figure 14:
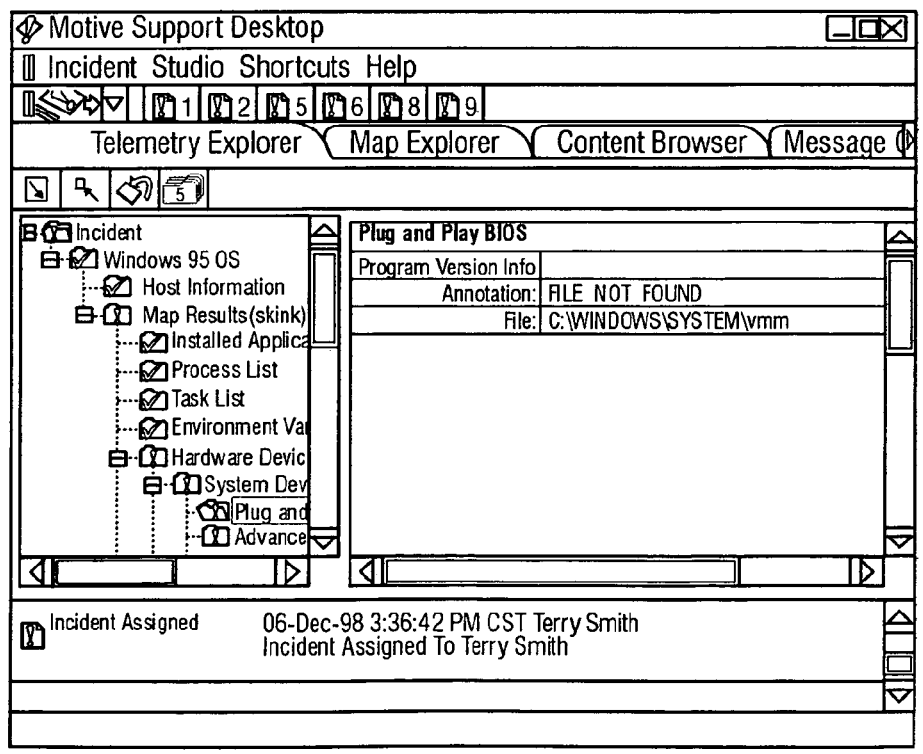

Preferably, the map results are grouped according to the structure of the map executed. For example, the map may define display groups that might include all the installed hardware information in one group and all the installed applications in another group. Telemetry is preferably displayed in the right panel by clicking on a given map in the hierarchy, as indicated in FIG. 14. When additional maps are run for an incident, the new telemetry preferably appears after the previous map.

Figure 15:
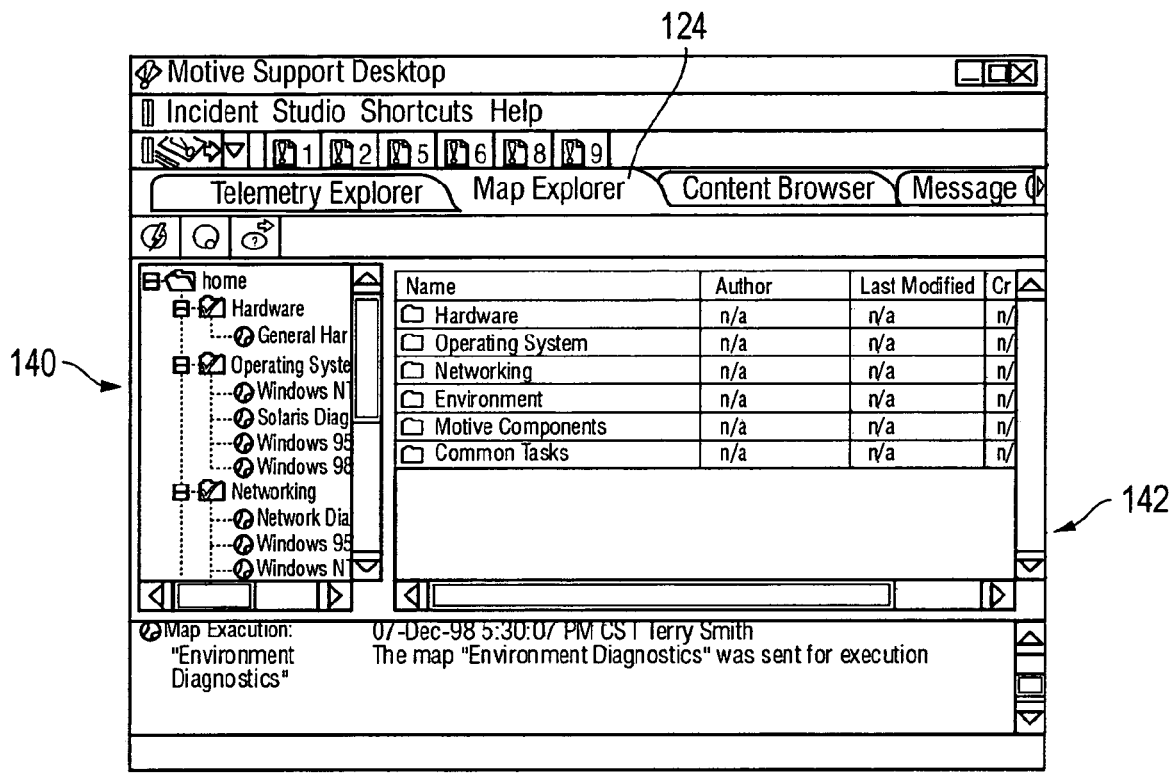
FIGS. 15–16 illustrate the Map Explorer panel of the system analyst's desktop.
Figure 16:
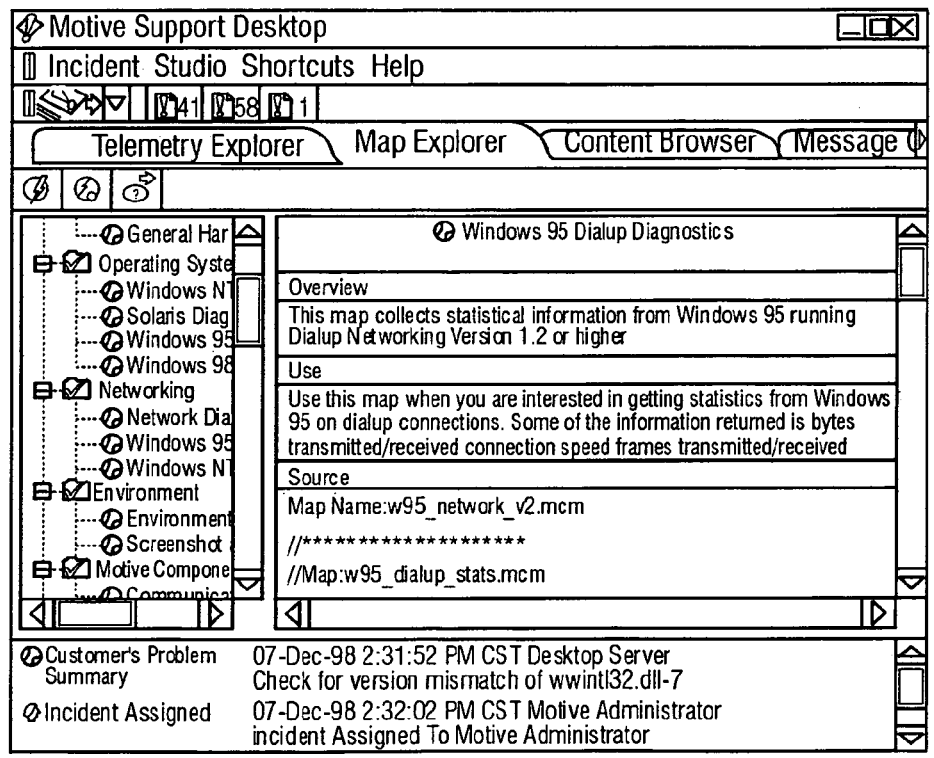

FIG. 15 illustrates the Map Explorer 124. This panel allows the system analyst to view all the maps currently in the active content database. Using this panel, the system analyst can locate a map relevant to a currently-selected incident, and that map may then be run on the end user's system, as previously described. As seen in FIG. 15, the left panel 140 shows a hierarchical view of the map catalog. The maps are preferably grouped into various categories, and the tree is navigated by clicking on the +/− boxes as described above. Selecting an item in the left panel 140 displays the contents or details of that item in the right panel 142. Double clicking on a map in the left panel displays the map in the right panel as illustrated in FIG. 16.

Figure 17:
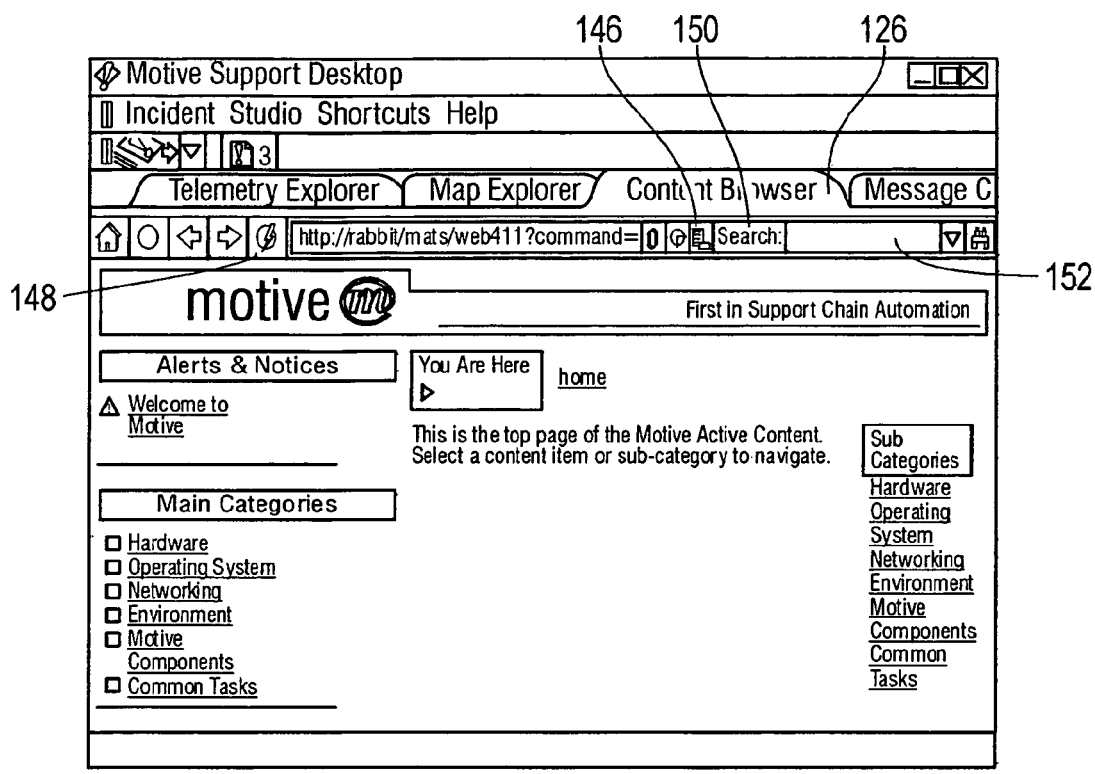
FIG. 17 illustrates the Content Browser panel of the system analyst's desktop.

FIG. 17 illustrates the Content Browser display panel 126 in more detail. The Content Browser is preferably web-based and allows the system analyst to search or browse content that might be related to or useful in resolving the incident. Typically, the support organization sets up this home page to include a list of categories and subcategories with links to other pages. These links are traversed in the usual manner. The Content Browser includes a toolbar having an Add to Journal icon 146 that adds a reference to the currently displayed page in the active journal. The Run Map icon 148 runs the map described on the currently displayed page. The Send URL icon 150 inserts the URL of the current page at the end of a current message in the Message Center, as will be seen. When the end user receives the message, the title of the web page appears as an active link, and the user can then click the link to view the web page in a browser. A search box 152 is also provided.

Figure 18:
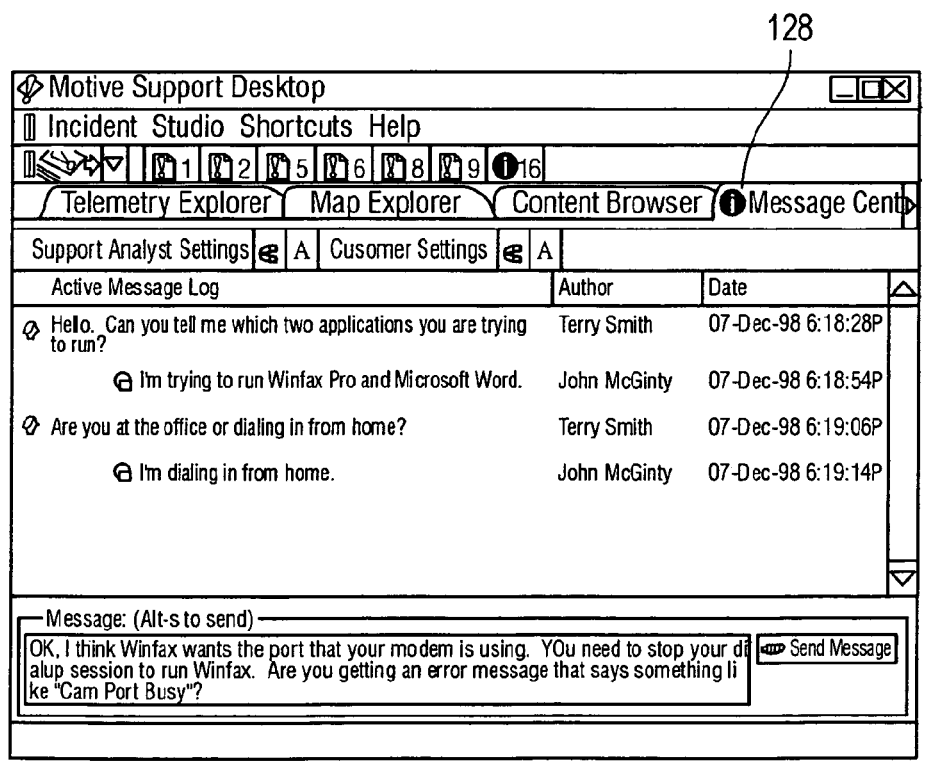
FIG. 18 illustrates the Message Center panel of the system analyst's desktop.

The Message Center panel 128 is illustrated in FIG. 18. The Message Center allows the system analyst to send active messages to the end user and view active messages sent by the end user. The Message Center thus displays what has been said by the user, and what has been said in response by the system analyst. As the dialog proceeds, the information is recorded.

Figure 19:
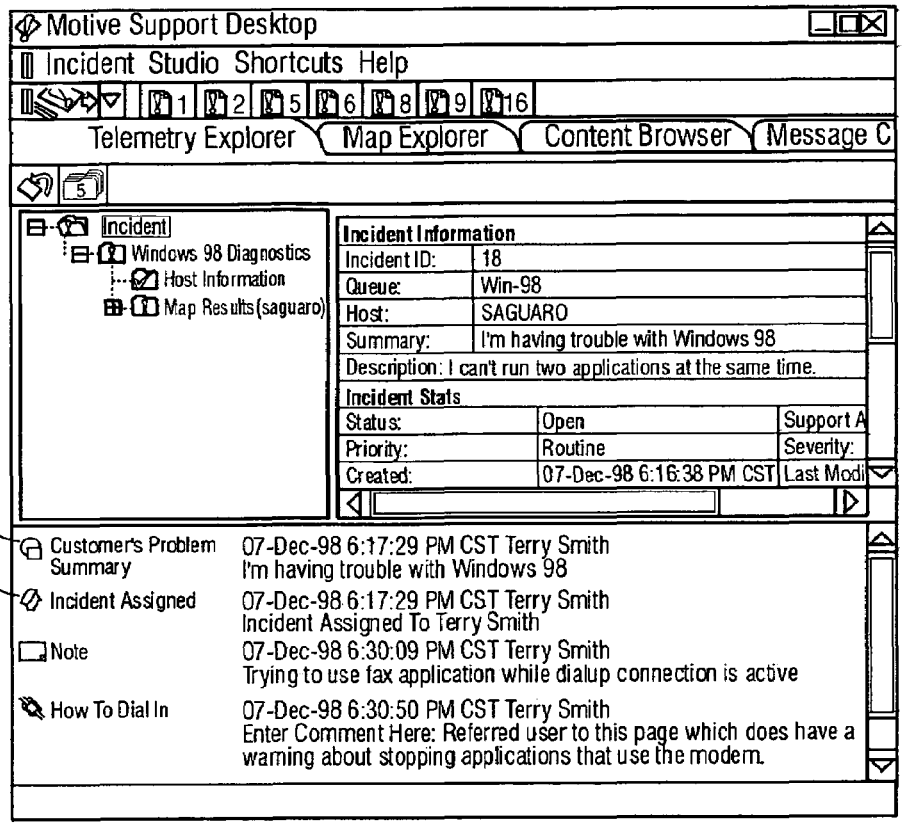
FIG. 19 illustrates how the active journal is used.

FIG. 19 illustrates the active journal functionality of the present invention. Generally, the system analyst can use the active journal to keep track of activities, important data, useful references, and other notes associated with an incident. When an incident is opened, the support desktop software automatically places two entries in the journal: the Customer's Problem Summary 160, which contains the problem description entered by the end user, and Incident Assigned 162, which records assignment of the incident to a given system analyst. Preferably, the support desktop software also automatically inserts journal entries when a system analysts runs an additional map on the end user's system or removes the incident from the desktop. FIG. 19 illustrates the active journal with such entries.

Preferably, a systems analyst can manually add entries to the active journal by adding a note, clicking a note, adding telemetry references, and adding a reference to an active page. In particular, the analyst adds a note preferably by clicking in the comment box of an empty entry at the bottom of the journal. The box then prompts the analyst for an entry. The analyst then clicks anywhere outside of the box to commit the entry, which will also show the time, date, and author. An existing note field is edited by clicking the existing note field. Telemetry references may be added by dragging a selected item from the Telemetry Explorer to the journal. The system analyst may then be prompted to add a note for the entry. A reference is added to the active page by locating the page in the Content Browser, and then clicking the Add to Journal toolbar button. The analyst may also be prompted to add a note for the entry at this time.

Journal entries may be modified or deleted. In addition, the system analyst can use the journal to navigate within the incident. For example, if a telemetry item is in the journal, he or she can click it to position the Telemetry Explorer to that telemetry. Likewise, if the analyst clicks on a journal entry associated with a content page, the Content Browser appears displaying that page.

Further, depending on how the site has published content, links back to journal entries may be created on content pages whenever a support analyst adds a content entry in a journal. These journal links may appear under a given heading. Moreover, a system analyst may backtrack from the pages displayed to examine what problems and troubleshooting processes have been related to the page in the past. When the analyst then clicks a journal link, a window appears to show the journal content.

Figure 20:
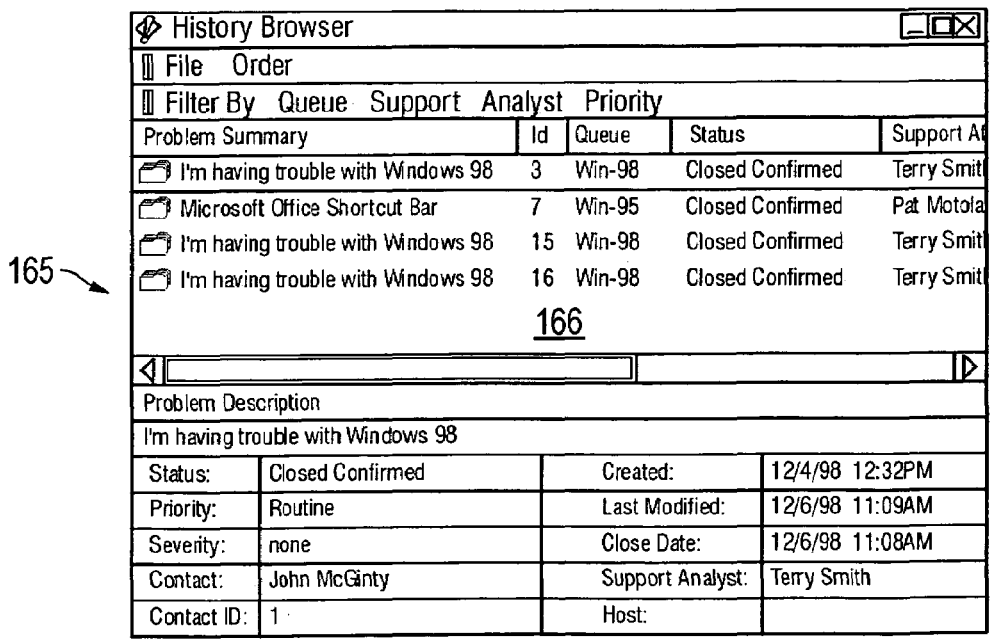
FIG. 20 illustrates a History Browser that may be used by a system analyst to locate information about incidents that have been resolved by other system analysts.

When an incident is resolved by a system analyst, it is marked as resolved. Closed or "resolved" incidents may be reviewed using a History Browser 165, as illustrated in FIG. 20. When the History Browser is selected, e.g., from a menu, it displays a list of the resolved incidents. That list includes a display area 166 that lists the incidents that have been resolved, and a problem synopsis 168, which displays summary information on an incident selected by the analyst. The system analyst may use the History Browser to identify other incidents that have been resolved. Each such incident may have an active journal associated therewith, as described above.

Thus, by selecting an incident previously resolved by a first analyst, a second analyst can use the first analyst's journal to attempt to resolve an incident currently facing the second analyst. The active journal entries created by the first analyst (or perhaps others) will typically be quite useful. The overall result of this process of sharing information is a significant decrease in time for addressing a given incident, thereby enhancing operational efficiencies for the overall support organization.

Thus, in the preferred embodiment, when an analyst clicks on a journal link in a content page, the journal may be popped up in another dialog box. The analyst can then browse around the journal entries. If the analyst then clicks on the one of these entries, the system tries to find related data in the current (i.e., the working) incident. For example, if the analyst clicks on a "map results" entry in the journal, the system will try to find the results of that map in the current incident's telemetry. If that map has not been run for this incident, the support analyst is prompted to run the map. Likewise, if the analyst clicks on a piece of telemetry data that was copied to the Journal, the system will try to find the data in the current incident's telemetry. Again, if such data is not found, the system will prompt the analyst to run the map.

The active journal provides numerous advantages. Foremost, a system analyst may leverage the work of other analysts that have already been exposed to and dealt with a given incident. The journal, in effect, becomes a guide for solving the problem in the future. Moreover, because the journal will often include specific information that was used successfully in the past (e.g., a given map), another system analyst already has information in the journal that either may solve the current incident or, at the very least, provide the analyst with a significant headstart in finding the desired solution. Using the journal, a given system analyst (e.g., an administrator) can associate a note (or some other content) with the journal, which may then be accessed by other analysts as the need arises. As has been described an illustrated, the journal itself is then useful as a navigation tool, or a vehicle for running maps, to drive the system analyst to the desired solution. During a live help session, conversations between the user and the system analyst are recorded, which can also be of assistance when viewed by other analysts. Further, the journal allows information from one incident to be manipulated (e.g., through a drag and drop interface operation), stored in the journal, and then made available for analysis and review by another analyst during another user's session. Of course, given the interactive nature of the journaling function, a given analyst may readily identify that other analysts have used a specific journal to address a given problem. This, in of itself, may lead to a faster response time.

As has been illustrated, preferably there is one active journal for each incident that shows that history of the incident. The journal automatically records the problem statement, support analyst assignment history, and map execution. During resolution of a given incident, the system analyst may add specific references to telemetry and other content. By adding these references to the journal of an incident, other support analysts can use this information when they view this incident in the History Browser.

The present invention facilitates leveraging of common information across all links in the automated technical support chain. This dramatically improves the efficiency of "back-end" processes in the support chain. For example, if a customer is unable to solve a problem through self-help, the automated support chain passes the specific information about the user's attempts to solve his or her problem along with the diagnostic state of the computer into the support center. This gives the next link in the chain a head-start in solving the problem rather than repeating previous steps, which can be time-consuming and frustrating for the customer.

Because all information in the technical support system is integrated along all points in the support chain, operators of the diagnostic center have the means to run much more efficient and effective reports for improved decision-making. For example, if a large amount of requests are made for content from a server, it may make sense to distribute support notes and maps directly out to end users' systems. Further, the operator may be interested in analyzing the effectiveness of self-service relative to automated service. By having an integrated reporting model, it is possible to analyze how early problems are being solved in the support chain and devise strategies to push solutions to earlier (and less expensive) links in the chain through time.

According to the present invention, various types of management reports may be generated for use in analyzing the effectiveness of the guided support process in general, the effectiveness of specific FAQ/resolutions, the effectiveness of specific maps, user satisfaction statistics, the self-help to live service info, "how to" versus system problem splits, and the like.

In the prior art, the responsibility of weeding out irrelevant support information is usually given to the end user. When a user is given too many choices, especially ones that do not matter, time is wasted and frustration levels rise. An advantage of the guided self-help functionality of the present invention is the ability to cut through all of the clutter and get to the root cause of the problem. This is accomplished in part by the creation of specific active content support pages into self selecting content. In particular, given logic/assertions may be added to a diagnostic map such that, when that map is executed, an output is provided that is a probability or weight of the relevance of the content page. As the user browses the categories of the active content trees, these logic segments are run dynamically (maybe automatically or by clicking a button) so that relevant content pages are presented.

As an example, assume that certain active content pages are only relevant for Windows NT client systems. The added assertion would be that the current system is that type of system. A much more complex example would involve checking registry values and installed software versions.

As information is provided to the diagnostic center, it is stored in the RDBMS to enlarge the "knowledge base" stored therein. In this manner, specific problems may be useful in generating new diagnostic maps that are then delivered or deliverable to the client machines as the system "grows" in expertise.

Although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language) and XML (Extended Markup Language).

Having thus described our invention, what we claim as new and desire to secure by Letters Patent is set forth in the following claims.

What is claimed is:

1. A method for automated technical support in a computer network, comprising:
   during a first live help session, creating a journal that comprises a history, wherein the history comprises description of a problem and a resolution of the problem, wherein the history further comprises a first plurality of telemetry items generated as a result of executing a first map against a first machine;
   during a guided self-help session, generating a second plurality of telemetry items as a result of executing a second map against a second machine;
   upon escalation to a second live help session following the guided self-help session, comparing each telemetry item of the first plurality of telemetry items with one or more items of the second plurality of telemetry items; and
   if a telemetry item of the first plurality of telemetry items compares equally with a telemetry item of the second plurality of telemetry items, presenting at least one of the first plurality of telemetry items in the journal on a third machine during the second live help session.

2. The method as described in claim 1 wherein the first map and the second map are the same.

3. The method as described in claim 1 wherein the first map comprises a programmable object for diagnosing problems with machines.

4. The method as described in claim 1 wherein the history includes a support analysis assignment history.

5. The method as described in claim 1 wherein the history further includes a reference to content used to diagnose the problem.

6. The method as described in claim 1 wherein the first map is executed during a self-help session.

7. The method as described in claim 1 wherein the first map is executed by a support analyst.

8. The method of claim 1 wherein the third machine is used by an agent participating in the second live help session.

9. The method of claim 1 wherein the presenting the at least one of the first plurality of telemetry items comprises presenting the resolution.

10. A method for automated technical support in a computer network, comprising:
   during a first live help session, creating a journal that includes a history of a problem and a resolution of the problem, the history including a reference to a diagnostic map and a plurality of first telemetry items previously generated as a result of executing the diagnostic map against a first machine;
   during a second live help session, retrieving the journal; and
   comparing given information in the journal with data generated during a guided self-help session as a result of executing a given diagnostic map against a second machine; and
   if the given information in the journal and the data generated as the result of executing the given diagnostic map are the same, presenting the given information in the journal on a third machine during the second live help session.

11. The method described in claim 10 wherein at least one of the first live help session and the second live help session follows a guided self-help session.

12. The method described in claim 11 further comprising repeating a given portion of the guided self-help session.

13. The method as described in claim 10 wherein the first live help session is assigned to a first support analyst and the second live help session is assigned to a second support analyst.

14. A method for automated technical support in a computer network, comprising:
   during a first live help session, creating a journal that includes a history of a problem incident and a problem resolution, wherein the history includes a plurality of first telemetry items generated as a result of executing a first map against a first machine;
   generating a plurality of second telemetry items as a result of executing a second map against a second machine during a guided self-help session;
   determining whether a portion of the first plurality of telemetry items in the journal is present in the second telemetry during a second live help session; and
   if the portion is present, presenting at least the portion of the first telemetry on a third machine during the second live help session.

15. The method of claim 14, further comprising:
   if the portion is present, providing access to the journal via the third machine during the second live help session.

16. The method of claim 14 wherein
   the third machine is used by an agent participating in the second live help session.

17. The method of claim 14 wherein
   the presenting the at least one of the first plurality of telemetry items comprises presenting the resolution.

18. A computer-readable medium having stored thereon a plurality of instructions for causing one or more processors to perform the following:
   create a journal that includes a history of a problem incident and a problem resolution during a first live help session, wherein the history includes a plurality of first telemetry items generated as a result of executing a first map against a first machine;
   generate a plurality of second telemetry items as a result of executing a second map against a second machine during a guided self-help session;
   determine whether a portion of the first plurality of telemetry items in the journal is present in the second plurality of telemetry items during a second live help session; and
   present at least the portion of the first plurality of telemetry items on a third machine during the second live help session if the portion is present.

19. The computer-readable medium of claim 18, further comprising instructions to cause the one or more processors to perform the following:
   provide access to the journal via the third machine during the second live help session if the portion is present.

20. The computer-readable medium of claim 18 wherein the third machine is used by an agent participating in the second live help session.

21. The computer-readable medium of claim 18 wherein the instructions to present the at least one of the first plurality of telemetry items comprise instructions to present the problem resolution.

* * * * *

UNITED STATES PATENT AND TRADEMARK OFFICE
CERTIFICATE OF CORRECTION

| | | |
|---|---|---|
| PATENT NO. | : 6,999,990 B1 | Page 1 of 1 |
| APPLICATION NO. | : 09/310795 | |
| DATED | : February 14, 2006 | |
| INVENTOR(S) | : Francis X. Sullivan and Brian Jay Vetter | |

It is certified that error appears in the above-identified patent and that said Letters Patent is hereby corrected as shown below:

At column 17, line 55 please delete "and"

Signed and Sealed this

Eighteenth Day of July, 2006

JON W. DUDAS
*Director of the United States Patent and Trademark Office*